Figure 2:
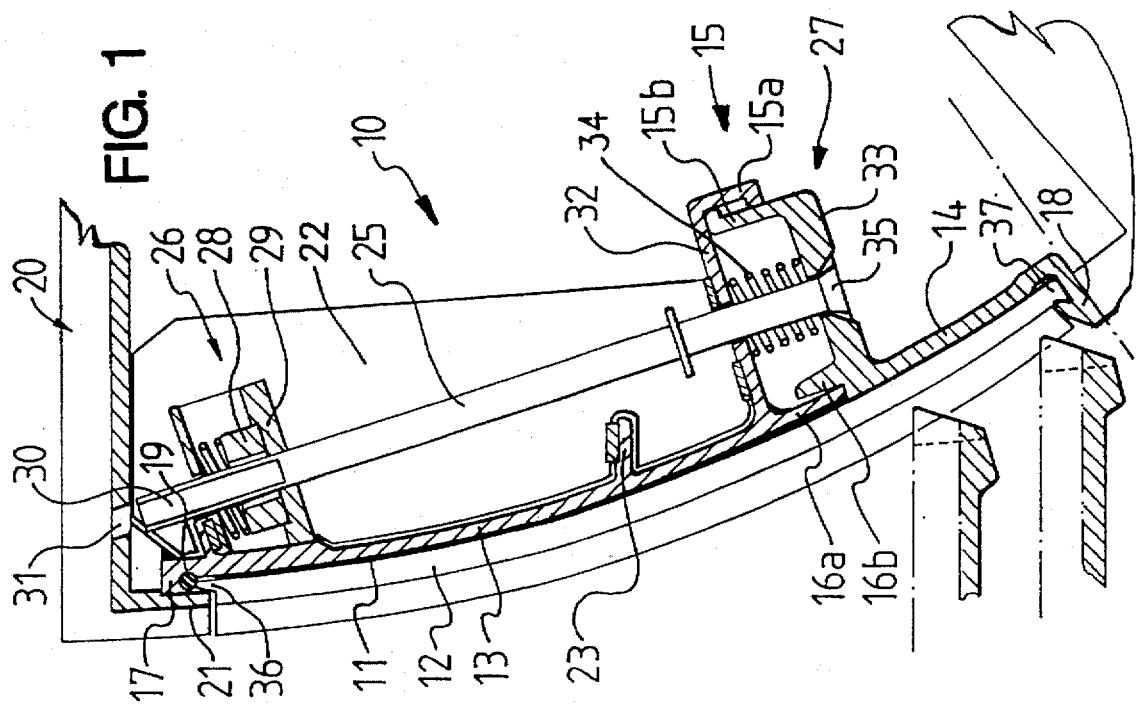

United States Patent [19]

Findlay et al.

[11] Patent Number: 5,685,412
[45] Date of Patent: Nov. 11, 1997

[54] ESCALATOR ADVERTISING

[76] Inventors: Alexander Findlay, 90 Normanby Road, Karaka Park R D 1, Papakura, Auckland, New Zealand; Neil Forrest Reid, 38 Penzance Road, Mairangi Bay, Auckland, New Zealand, 1310

[21] Appl. No.: 636,987
[22] Filed: Apr. 24, 1996

[30] Foreign Application Priority Data

Apr. 28, 1995 [NZ] New Zealand .................... 272018

[51] Int. Cl.$^6$ ............................................. B66B 23/12
[52] U.S. Cl. ............................ 198/502.1; 198/333
[58] Field of Search ..................... 198/333, 502.1

[56] References Cited

U.S. PATENT DOCUMENTS

| 5,176,239 | 1/1993 | Findlay et al. | 198/333 X |
| 5,411,127 | 5/1995 | Findlay | 198/502.1 X |
| 5,439,090 | 8/1995 | Findlay | 198/502.1 X |

*Primary Examiner*—James R. Bidwell
*Attorney, Agent, or Firm*—Young & Thompson

[57] ABSTRACT

A removable transparent cover plate for a sign to be attached to the riser (ie the vertical face) of an escalator step has a concealed screw-clamp fastening system. The riser is made with two movably engaged jaws, spring-biassed towards an open configuration and connected with a threaded rod by which they can be pulled together into a closed configuration, to hold the sign and transparent cover plate in place.

6 Claims, 1 Drawing Sheet

ESCALATOR ADVERTISING

FIELD OF THE INVENTION

The present invention relates to the general field of advertising, with particular application to the mounting of signs or other indicia on the riser (ie the vertical face) or the tread (the horizontal surface) of an escalator step.

PRIOR ART

International Patent Application PCT/GB92/01037 published under the Patent Cooperation Treaty as No. WO 92/22491 shows and describes an escalator step having a sign or other indicia mounted on a riser or tread, with a transparent cover plate to protect the sign and match the cleated profile of the step. The sign is mounted on the step with a plurality of fasteners passing through both the cover plate and the sign, engaging in a backing plate on the step.

A potential difficulty with the above system may be found with fastening and unfastening the cover plate and sign, to remove or replace the sign. The fasteners themselves may be prone to being lost or damaged, and difficulties in manipulating the sign, the cover plate and the fasteners may result in the sign being marked or damaged during replacement. In any case, the operation may be found to be time-consuming.

OBJECT

It is an object of the present invention to go at least partway towards overcoming the above difficulty, or at least to provide the public with a useful choice.

STATEMENT OF INVENTION

In one aspect the present invention provides a passenger conveying device such as an escalator having a plurality of interacting movable steps, each said step having a defined external profile allowing relative movement between adjacent steps, with means for displaying indicia on at least one said step, said means including a cover fastened to said step, said cover having an external profile corresponding to the defined external profile of said steps, characterised in that said cover is fastened to said step by mounting means including opposed lips associated with said step, engaged over each of two opposing edges of said cover, at least one of said lips being movable relative to said step, to engage and disengage said cover with said step.

Preferably the mounting means includes a backing surface underlying said cover comprised of two sections, one of said opposed lips being fixed relative to each said section, and at least one of said sections being movable with one said lip relative to said step.

Preferably the movable section is pivotally movable relative to said step.

Preferably one section is slideably movable relative to said step and relative to the other said section, such that a distance between said opposed lips can be made greater than and less than the distance between said opposing edges of said cover, by movement of said section.

Preferably the opposed lips are movable by the action of means including a screw-threaded rod interconnecting them.

Preferably the two opposing edges of said cover comprise upper and lower edges, and a lower said opposed lip is movable with said cover relative to said step, to engage and disengage said cover with an upper said opposed lip.

Figure 1:
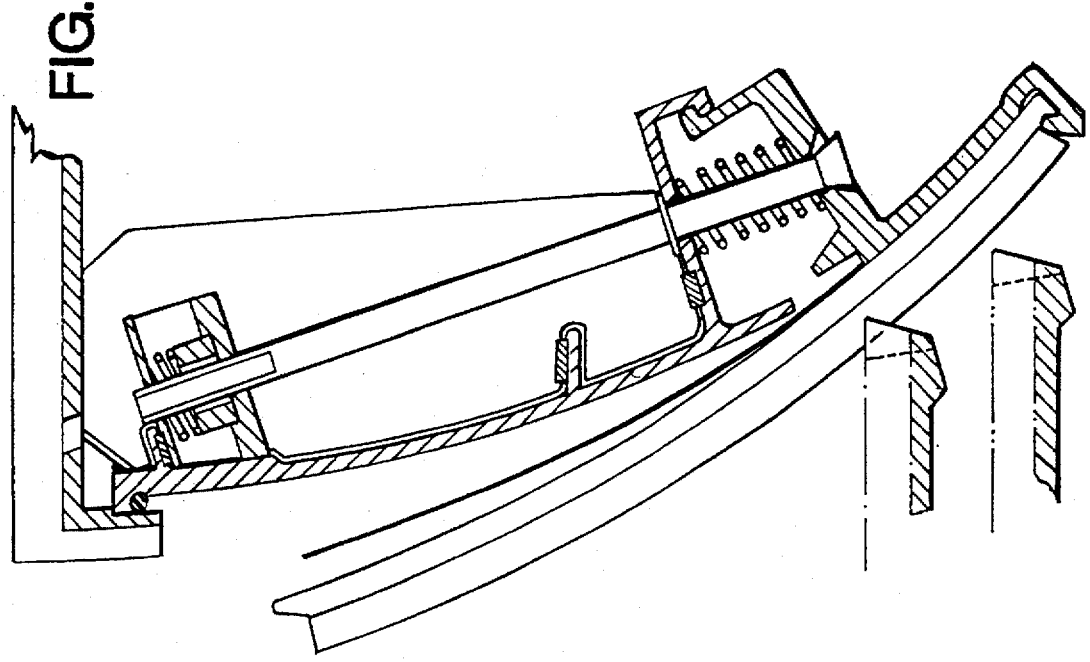

These and other aspects of the present invention may be made apparent in the following description of a preferred embodiment, given by way of example only, with reference to the accompanying drawings in which:

FIG. 1: illustrates a preferred form of the present invention in side view and cross-section, in a closed configuration;

FIG. 2: illustrates the embodiment of FIG. 1 in side view and cross-section, in an open configuration.

BEST MODE

The preferred form of the present invention, as illustrated in the drawings, is comprised of an escalator riser assembly 10, by which a sign 11 or other indicia or decoration and a cover plate 12 are mounted on the riser 21 of an escalator step 20. In its preferred form, the present invention provides a screw-operated clamping system in the riser 21, by which the cover plate 12 can be releasably held with a pair of jaws.

The riser assembly 10 includes an upper backing plate 13 and a lower backing plate 14, connected by an interlocking link 15 which allows sliding and pivotal movement between the two plates. Preferably as shown, the link 15 is comprised of oppositely hooked flanges 15a and 15b, and preferably parallel flanges 16a and 16b are also provided to act as bearing surfaces and hold the two plates 13 and 14 in alignment. In the closed position as illustrated in FIG. 1 the plates 13 and 14 lie in substantially the same radiused plane, behind the general plane of the riser 21.

Both plates 13 and 14 include a forwardly projecting lip, the upper plate 13 having a hooked lip 17 at its upper edge, and the lower plate 14 having a hooked lip 18 at its lower edge. The upper lip 17 is preferably undercut to house a sealing element 19, and the lower lip 18 is recurved to create a channel in which the lower edge of the cover plate 12 is mounted.

The upper backing plate 13 is fastened within the step 20, and does not move in normal use.

Preferably the assembly 10 includes one or more gussets 22 which fasten and support the upper backing plate 13 in place, and which are welded to lugs 23 projecting from the back of the plate 13.

The lower backing plate 14 is arranged to move relative to the upper plate 13 on the link 15, and is held in place by a connecting rod 25. The rod 25 passes downwardly behind the backing plate 13, between a pair of mounting assemblies 26 and 27.

The upper mounting assembly 26 is fixed to the back of plate 13, and comprises a nut 28 in a housing 29. The rod 25 is screw-threaded to engage with the nut 28, and is provided with means 30 to facilitate turning with a tool, such as a spanner or key, so that the rod 25 can be wound up and down relative to the nut 28. An aperture 31 is provided in the step 20 to allow access to the means 30 with such a tool.

The lower mounting assembly 27 is comprised of a plate 32 projecting from the back of the upper mounting plate 13, and a plate 33 projecting from the back of the lower mounting plate 14, each with an aperture through which the rod 25 passes. The rod is provided with a cap 35 which prevents it from being withdrawn from the aperture in the lower plate 33, and a spring 34 between the plates 32 and 33 presses the lower plate firmly against this cap. As the rod 25 is turned, the cap 35 is raised or lowered relative to the upper backing plate 13, and the lower plate is raised or lowered with it by the plate 33, sliding or pivoting on the connection 15. The plate 33 is preferably able to rock or pivot on the cap 35 as it moves up and down, to accommodate pivotal movement of the lower backing plate 14.

As shown in FIG. 1, when the apparatus is in a closed configuration, the cover plate 12 is held in place on the riser 21 by an upper flange 36 pushed up behind the riser 21 into contact with the sealing element 19, and by a lower flange 37 held in the channel formed by the lower lip 18 of the lower backing plate 14. As the rod 25 is wound down, the lower backing plate 14 moves down and back, to the position illustrated in FIG. 2. As it does so, the cover plate 12 moves downwardly with it, until the upper flange 36 is released from behind the riser 21.

As the lower backing plate 14 pivots back on the link 15, the cover plate 12 tips forward as shown in FIG. 2, allowing easy access to the sign 11.

By this means, the sign 11 can be removed and replaced by the operation of a single rotary fastener 30. Movement and engagement of the cover plate 12 is relatively smooth and even, reducing the likelihood of misalignments or other potential problems.

The sign can be seated against the top of the lower backing plate 14 when the assembly is in an open configuration, to stand straight and square behind the cover plate 12 while the assembly is closed.

INDUSTRIAL APPLICATION

The preferred form of the invention allows for a concealed screw-clamp fastening system, minimising the risk of vandalism and allowing for ease of replacement of a sign on the riser of an escalator step. It has application to various types of signs and to advertising or promotional material to be displayed on escalators.

VARIATIONS

It will be appreciated that a wide variety of changes and modifications might be made to the above example within the general scope of the present invention.

For example, while a screw-rod clamping mechanism is preferred as described, a lever operated system could be used instead to raise and lower the lower backing plate between open and closed positions. Similarly, a variety of different coupling mechanisms such as pin and slot connectors or resilient links could be used instead of the sliding and pivoting link described above. Both lips holding the cover plate could be moved by the action of the rod 25, to hold or release the cover plate, or the upper lip could be moved instead of the lower one.

Although it is preferred that the lips are disposed on the upper and lower edges of the riser, it is also possible to adapt this feature to allow for a removable cover on the tread, or to allow for the lips to be situated along the two vertical outer edges of the riser.

Other details of construction, dimensions and arrangements might be altered to suit different steps or applications, within the scope of the present invention.

We claim:

1. A passenger conveying device such as an escalator having a plurality of interacting movable steps, each said step having a defined external profile allowing relative movement between adjacent steps, with means for displaying indicia on at least one said step, said means including a cover fastened to said step, said cover having an external profile corresponding to the defined external profile of said steps, characterised in that said cover is fastened to said step by mounting means including opposed lips associated with said step, engaged over each of two opposing edges of said cover, at least one of said lips being movable relative to said step, to engage and disengage said cover with said step.

2. A passenger conveying device as claimed in claim 1, characterised in that said mounting means includes a backing surface underlying said cover comprised of two sections, one of said opposed lips being fixed relative to each said section, and at least one of said sections being movable with one said lip relative to said step.

3. A passenger conveying device as claimed in claim 2, characterised in that said at least one movable section is pivotally movable relative to said step.

4. A passenger conveying device as claimed in claim 2, characterised in that one section is slideably movable relative to said step and relative to the other said section, such that a distance between said opposed lips can be made greater than and less than the distance between said opposing edges of said cover, by movement of said section.

5. A passenger conveying device as claimed in claim 1, characterised in that said opposed lips are movable by the action of means including a screw-threaded rod interconnecting them.

6. A passenger conveying device as claimed in claim 1, wherein the cover is fastened to the riser of the step characterised in that said two opposing edges of said cover comprise upper and lower edges of the riser, and a lower said opposed lip is movable with said cover relative to said step, to engage and disengage said cover with an upper said opposed lip.

* * * * *